(12) United States Patent
Mazet et al.

(10) Patent No.: US 10,989,484 B2
(45) Date of Patent: Apr. 27, 2021

(54) ELECTRICITY PRODUCTION FACILITY INCLUDING HEAT STORAGE

(71) Applicants: CENTRE NATIONAL DE LA RECHERCHE SCIENTIFIQUE, Paris (FR); UNIVERSITE DE NANTES, Nantes (FR)

(72) Inventors: Nathalie Mazet, Perpignan (FR); Sylvain Mauran, Millas (FR); Pierre Neveu, St Michel de Llotes (FR); Driss Stitou, St Nazaire en Roussillon (FR); Lingai Luo, Nantes (FR); Yilin Fan, La Chapelle sur Erdre (FR)

(73) Assignees: CENTRE NATIONAL DE LA RECHERCHE SCIENTIFIQUE, Paris (FR); UNIVERSITE DE NANTES, Nantes (FR)

( * ) Notice: Subject to any disclaimer, the term of this patent is extended or adjusted under 35 U.S.C. 154(b) by 36 days.

(21) Appl. No.: 16/471,414

(22) PCT Filed: Dec. 18, 2017

(86) PCT No.: PCT/FR2017/053633
§ 371 (c)(1),
(2) Date: Jun. 19, 2019

(87) PCT Pub. No.: WO2018/115668
PCT Pub. Date: Jun. 28, 2018

(65) Prior Publication Data
US 2019/0390920 A1   Dec. 26, 2019

(30) Foreign Application Priority Data
Dec. 19, 2016   (FR) .................................... 1662785

(51) Int. Cl.
*F28D 20/00* (2006.01)
*F28D 21/00* (2006.01)

(52) U.S. Cl.
CPC ......... *F28D 20/003* (2013.01); *F28D 21/001* (2013.01); *F28D 2021/0063* (2013.01)

(58) Field of Classification Search
CPC ................. F28D 20/003; F28D 21/001; F28D 2021/0063; Y02E 60/14; F01K 3/188; F01K 3/00
(Continued)

(56) References Cited

U.S. PATENT DOCUMENTS 9,347,690 B2 * 5/2016 Ma ...................... F28D 20/0056
2009/0071155 A1 * 3/2009 Boyapati ............... F01K 25/065
60/649
(Continued)

FOREIGN PATENT DOCUMENTS

CN   103 742 964   8/2016
DE   27 51 368     5/1979
(Continued)

OTHER PUBLICATIONS

International Search Report, PCT/FR2017/053633, dated May 4, 2018.

*Primary Examiner* — Hoang M Nguyen
(74) *Attorney, Agent, or Firm* — Nixon & Vanderhye

(57) ABSTRACT

Disclosed is an installation for generating electricity from a heat source, for disconnecting the production of electricity from the source of heat. The main characteristic of such installation is that it includes a thermochemical storage device coupled to a power cycle, the storage device consisting of a reactor in which produces a reversible sorption process and an evaporator and a condenser, at least one of the components of the thermochemical device being coupled (Continued)

mass and/or thermal to at least one element of the power cycle.

20 Claims, 18 Drawing Sheets

(58) Field of Classification Search
USPC .......................................................... 60/659
See application file for complete search history.

(56) References Cited

U.S. PATENT DOCUMENTS

| | | | |
|---|---|---|---|
| 2013/0098035 A1* | 4/2013 | McAlister | F03G 6/068 60/641.7 |
| 2015/0053366 A1* | 2/2015 | Melsheimer | E04H 14/00 165/10 |
| 2016/0069218 A1 | 3/2016 | Lenk et al. | |
| 2017/0010028 A1* | 1/2017 | Bao | F25B 17/083 |

FOREIGN PATENT DOCUMENTS

| | | |
|---|---|---|
| FR | 2 577 614 | 8/1986 |
| WO | WO 2009/121246 | 10/2009 |

\* cited by examiner

ELECTRICITY PRODUCTION FACILITY INCLUDING HEAT STORAGE

BACKGROUND OF THE INVENTION

Field of the Invention

The invention relates to a power generation plant with heat storage.

In this way, in the case for example where this facility would operate from a solar heat source, said installation could through this heat storage, produce electricity during periods during which said source would not be available, as for example at night, and produce a supplement of electricity that would be added to the electricity directly produced from the solar heat source.

Description of the Related Art

To do this, thermal storage of an installation according to the invention is inserted between a heat source and a steam power cycle. At present, solar power plants include thermal storage, with storage periods of up to 15 hours.

Storage technologies are essentially based on the sensible heat of materials and are therefore low energy densities, typically between 20 and 50 kWh/m$^3$. It being understood that the energy density is the ratio between the useful thermal energy restored to the power cycle and the volume occupied by the storage material. Phase change materials, such as for example nitrate salts, are also studied for their better energy density, between 50 and 100 kWh/m$^3$. However, the low conductivity of these materials limits the return power of the stored thermal energy. In addition, the costs, availability and risks of nitrates can be prohibitive.

SUMMARY OF THE INVENTION

The subject of the invention is an installation for producing electricity from a heat source, making it possible to dissociate electricity production from the use of said heat source over time.

The main characteristic of an installation according to the invention is that it comprises a thermochemical storage device (STC) coupled to a power cycle (CDP), said storage device consisting of a reactor in which a process occurs. reversible sorption device and an evaporator and a condenser, at least one of the components of the thermochemical device being coupled mass and/or thermal to at least one element of said power cycle.

The principle of an installation according to the invention consists in integrating a thermochemical storage system into a power cycle, which may for example be a thermodynamic steam cycle.

The proposed designs are adapted to different external heat sources, for example solar power or heat rejects, and to different steam power cycles.

Renewable energies are destined to play a significant role in the various scenarios for reducing greenhouse gas emissions, but their intermittency remains a key point to resolve for the development of their use. On the other hand, thermal discharges, especially on industrial sites, represent a considerable amount of thermal energy whose availability is not always in phase with the potential use. Thanks to such an installation equipped with a thermochemical storage device coupled by mass and/or heat to a power cycle, it becomes possible to shift the electrical production over time to tighter and more interesting periods of time an environmental or economic point of view.

In general, a thermochemical storage system involves on the one hand a reversible chemical reaction between a solid and a gas (for example: Ca (OH)$_2$ $\Leftrightarrow$ and on the other hand another monovariant transformation involving the same reactive gas (for example the change of liquid state/H$_2$O vapor). This heat storage is based on the enthalpies of these gas phase/condensed phase equilibria, which leads to higher energy densities than state-of-the-art storage facilities.

This method makes it possible to control the operation of the storage and retrieval phases, this enthalpy being stored without loss as long as the reagents (CaO and H$_2$O in the previous example) are kept separately, which makes it possible, for example, to shift the storage and restitution of several days. It is thus possible to carry out a long-term storage of the heat, the losses by sensible heat being negligible An installation according to the invention makes it possible to implement a thermochemical storage device allowing high storage energy densities, typically between 100 and 600 kWh/m$^3$ of storage material, depending on the nature of the reactive couples, while avoiding the drawbacks in the state of the art relating to the availability and risks of the storage material.

Depending on the reagent used, various temperature sources may be used. These source temperatures can be high, for example, of the order of 1000° C. conceivable with the reaction Ba(OH)$_2$ $\Leftrightarrow$ BaO+H$_2$O.

In view of the limitations of existing heat storage systems, a thermochemical storage method according to the invention makes it possible to store a large amount of heat with high energy densities, and a control of the storage and rendering phases. It helps to provide electric power at all times, especially when demand is high (peak hours) or when the external heat source is no longer available (at night for example in the case of solar energy) or insufficient power. An installation according to the invention produces improved energy densities and increased overall efficiency compared to a conventional solar power plant without storage.

For an installation according to the invention, two types of main integration configurations are proposed:

- Integration of thermal type carried out by the coupling via intermediate heat exchangers: on the one hand between an external heat source circuit and the storage device for the storage phase, and on the other hand, between the storage thermochemical and power cycle for the storage and/or destocking phase;
- A mass-type integration consisting of a steam exchange between the thermochemical storage and the power cycle, in the case where the thermochemical process and the engine cycle operate with the same working fluid, for example water vapor. The steam engine circuit can then serve as a source/sink of reactive gas for the thermochemical storage system. The resulting energy densities will thus remain closer to those of the reactor alone.

The proposed designs allow the operation of a thermal power plant using for example solar energy as an external source of heat, driving in a wide range of storage/retrieval scenarios from continuous production day and night, to a production of duration limited during peak periods.

Thermochemical storage is integrated between the energy source and the steam power cycle. It allows operation of a longer duration than that from the sole use of intermittent energy (solar) or even continuous power cycle. The duration of storage could vary between 4 h and 10 h, while the destocking period could vary between 1 h and 14 h.

Compared with a basic thermochemical storage, the configurations of integration of a thermochemical storage with a power cycle according to the invention make it possible to reduce, depending on the type of integration envisaged, the amount of heat taken from the external source, i.e. the amount of heat released to the environment. The proposed integrations thus make it possible, according to proposed configurations, to increase the efficiency, to reduce the size of the solar field in the case of a thermodynamic solar power station, or to reduce the size of the exchangers for heat discharges towards the ambient environment. The integration of the thermochemical storage system not only improves the adaptability of thermodynamic solar power plants, but also increases the overall efficiency of the cycle.

Preferably, a mass coupling between said at least one component of the thermochemical device and said at least one element of the power cycle results in a steam exchange.

Preferably, a thermal coupling between said at least one component of the thermochemical device and said at least one element of the power cycle results in a heat transfer.

Advantageously, the external heat source is constituted by at least one element to be chosen from heat generating devices such as a solar power plant, a boiler, a geothermal source, or heat rejections of any thermal process.

Advantageously, the power cycle is to be chosen from steam cycles such as organic Rankine cycles or not, Hirn or Kalina.

Preferably, the power cycle is a Rankine cycle and comprises a heat exchanger accepting heat from an external source, a heat exchanger rejecting heat at a lower temperature, and a vapor expansion member, preferably a steam turbine.

Advantageously, the heat source has intermittent availability and/or variability in thermal power and/or temperature and/or economic value.

Another object of the invention is a first method of producing electricity in an installation according to the invention.

The main characteristic of a first method according to the invention is that it comprises a coupling step between the external heat source and at least one element of the installation for carrying out a heat storage step in the storage device. thermochemical (STC) and a power generation stage by the power cycle (CDP).

Advantageously, the external heat source simultaneously feeds the power cycle and the thermochemical storage device, and a thermal coupling is realized between the desuperheating and the condensation of the steam of the thermochemical storage device, and at least one of the elements a preheater, evaporator, superheater of a working fluid of the power cycle.

Preferably, the external heat source feeds the power cycle, and thermal coupling is performed between the reactor of the thermochemical storage device and the expanded vapors from an expansion member of the power cycle.

Preferably, the external heat source simultaneously feeds the power cycle and the thermochemical storage device, and a mass coupling is made between the reactor of the thermochemical storage device and an expansion stage of a turbine of the power cycle or of an additional independent turbine.

Advantageously, the external heat source supplies only the thermochemical storage device, and a thermal coupling is made between the condenser of the thermochemical storage device and a preheater, an evaporator and possibly a superheater of the power cycle.

Advantageously, the external heat source supplies only the thermochemical storage device, and a mass coupling is made between the reactor of the thermochemical storage device and an expansion stage of a turbine of the power cycle.

Preferably, a method of producing electricity according to the invention comprises a step of implementing an intermediate heat exchanger supplied by the external heat source to increase the temperature of the vapors desorbed by the thermochemical storage reactor.

Another object of the invention is a second method of producing electricity in an installation according to the invention. The main characteristic of a second method according to the invention is that it comprises the following functions:

A thermal coupling step between the reactor of the thermochemical storage device and an assembly constituted by a preheater, an evaporator and possibly a superheater belonging to the power cycle, A step of destocking and generating electricity from the heat destocked by said thermochemical reactor and transmitted to said assembly.

Advantageously, a second method according to the invention comprises a step of thermal coupling between a condenser of the power cycle and an evaporator of the thermochemical storage device, so as to recover heat from said condenser to supply said evaporator.

Preferably, a second method according to the invention comprises a step of thermal coupling between the evaporator of the thermochemical storage device and an expansion stage of a turbine of the power cycle, so as to recover heat by means of an exchanger, on a vapor withdrawal at one or more intermediate stages of said turbine to supply said evaporator.

Preferably, a method according to the invention comprises a step of mass coupling between the reactor of the thermochemical device and the output of a turbine of the power cycle, so that a part of the expanded vapors at the turbine outlet is absorbed by said reactor in the destocking phase.

Another subject of the invention is a third method for producing electricity in an installation according to the invention.

The main characteristic of a third method according to the invention is that the step of producing electricity by the power cycle is carried out simultaneously using the external heat source and the destocking of the heat accumulated in the thermochemical storage device.

This method has the advantage of allowing the production of electrical power greater than that achievable using only the external heat source. This process makes it possible to target the periods when the demand for electrical energy is crucial and for which current installations are not able to provide this electrical energy in the best conditions. These periods may, for example, correspond to periods when the demand for electrical energy is high (periods for which there is a peak in consumption), or to periods when the power supplied by the external source, in the case of a source variable, decreases and becomes insufficient to power the power cycle and provide electricity demand.

Advantageously, a third method according to the invention comprises a step of thermal coupling between a condenser of the power cycle and an evaporator of the thermochemical storage device, so as to recover heat from said condenser to supply said evaporator.

Preferably, a third method according to the invention comprises a step of thermal coupling between an evaporator of the thermal storage device and an expansion stage of a turbine of the power cycle, so as to recover heat by means of an exchanger on a withdrawal at the stages of said turbine to supply said evaporator, and a thermal coupling step between the reactor of the thermal storage device and the previous withdrawal so as to superheat this steam, by means of a superheater for supplying the next expansion stage of a turbine of the power cycle.

Preferably, a third method according to the invention comprises a step of mass coupling between the reactor of the thermochemical storage device and the output of a turbine of the power cycle, so that a part of the expanded steam at the turbine outlet is absorbed by said reactor in the destocking phase.

BRIEF DESCRIPTION OF THE DRAWINGS

The following is a detailed description of several preferred embodiments of an installation according to the invention, with reference to the following figures.

DESCRIPTION OF THE PREFERRED EMBODIMENTS

The key problem to be solved is the integration of such a thermochemical storage system in a plant installation that overcomes the intermittency of the availability of the external power source or the variation of the power of the source or the demand for electricity produced.

Two types of installations are envisaged:
An installation corresponding to a mass integration,
An installation corresponding to a thermal integration.

Figure 1:
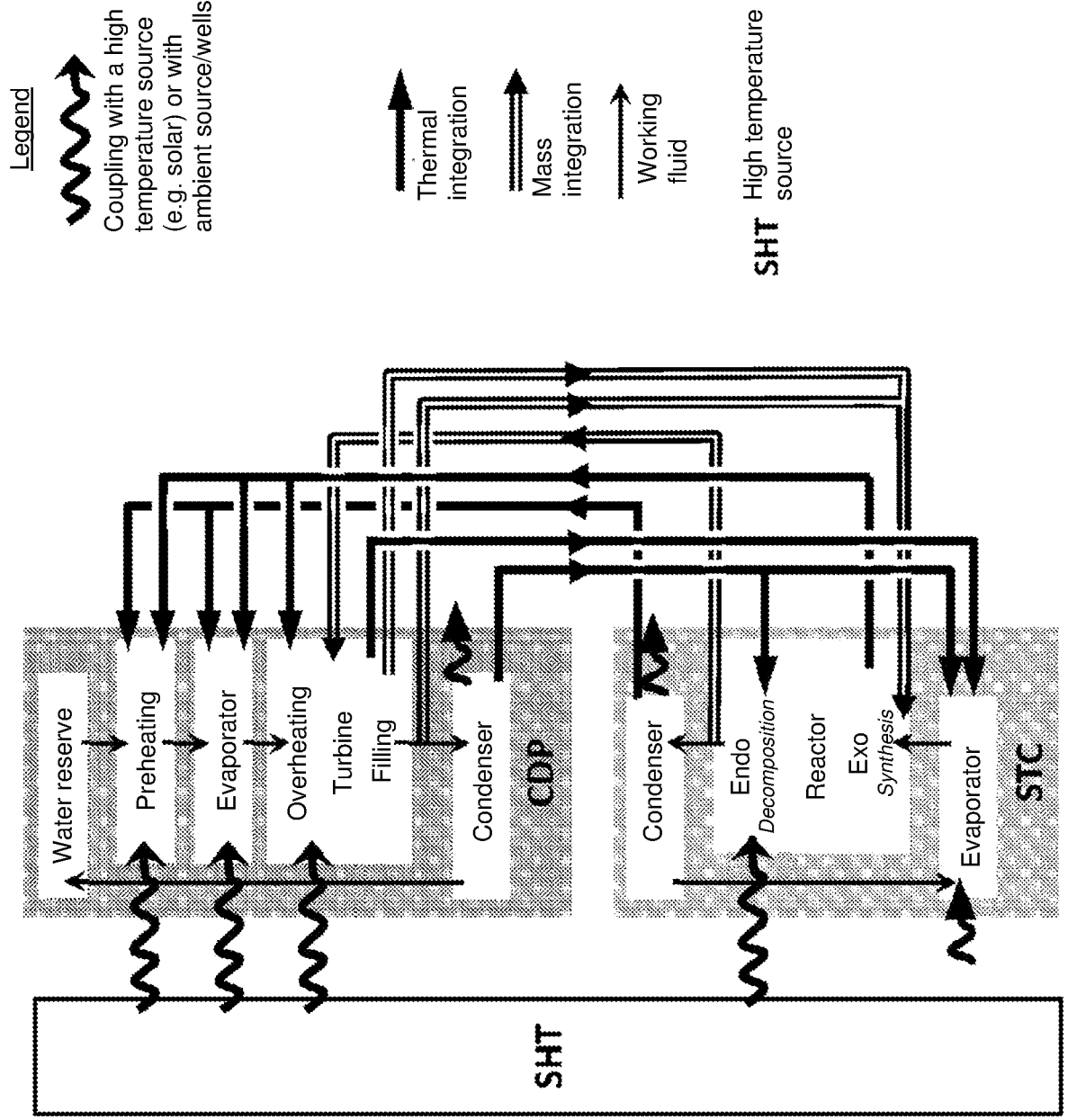
FIG. 1 is a logic diagram showing exhaustively all the possibilities of integration of a thermochemical storage device in an installation according to the invention.

The general integration methodology shown in FIG. 1 consists in associating one or more exothermic elements of one system with one or more endothermic elements of the other system (thermal integration), or a generator of the steam of a system with one steam consumer element of the other system (mass integration).

FIG. 1 shows, through a logic diagram, the different possibilities of integration and cascades between the three components of an electricity generation method according to the invention, and based on a thermochemical storage device.

These three components are:
An external thermal energy source system 1, which may for example be a concentrated solar field,
A power cycle (CDP) is to be chosen from steam cycles such as organic or non-organic Rankine cycles, Hirn or Kalina. In the example of FIG. 1, the steam power cycle is described in FIG. It conventionally comprises a steam expansion turbine 3 which may comprise several expansion stages separated by steam heaters and vapor withdrawals, for the generation of work convertible into electrical energy, a preheater 6/evaporator 2/superheater 7 operating at high pressure, a condenser 4 operating at low pressure and ensuring the desuperheating of the steam and its condensation, and a reservoir of the liquid working fluid 5,
A thermochemical storage method (STC), described in FIG. 2, comprising a thermochemical reactor 12 in which a reversible sorption process occurs, either coupled to a condenser 13 for the desuperheating of the steam coming from the reactor and its condensation during the storage phase thermal energy, either to an evaporator 11 during the heat destocking phase, and a liquid phase reactive fluid reservoir 14.

In the case of an intermittent source such as a solar source, the implementation of these configurations depends on the availability of said source. In other words, in the example of a solar source, it must be taken into account that it is day or night.

Depending on the availability of the external source, the installation can realize several features:
Electrical production and/or storage from the external heat source, storage from the external heat source, and, in cascade, power generation by the power cycle supplied by the steam from the reactor in storage either by recovering its sensible and latent heat (thermal integration), or by exploiting the steam itself (mass integration).

Destocking and cascading electricity production using the heat removed from the reactor. This configuration allows the production of electricity in the absence of external heat source.

Production of electricity from the external heat source and in parallel another production from the destocking of the reactor. This configuration is particularly interesting for boosting electricity production when the source is available and meeting demand peaks.

Figure 2:
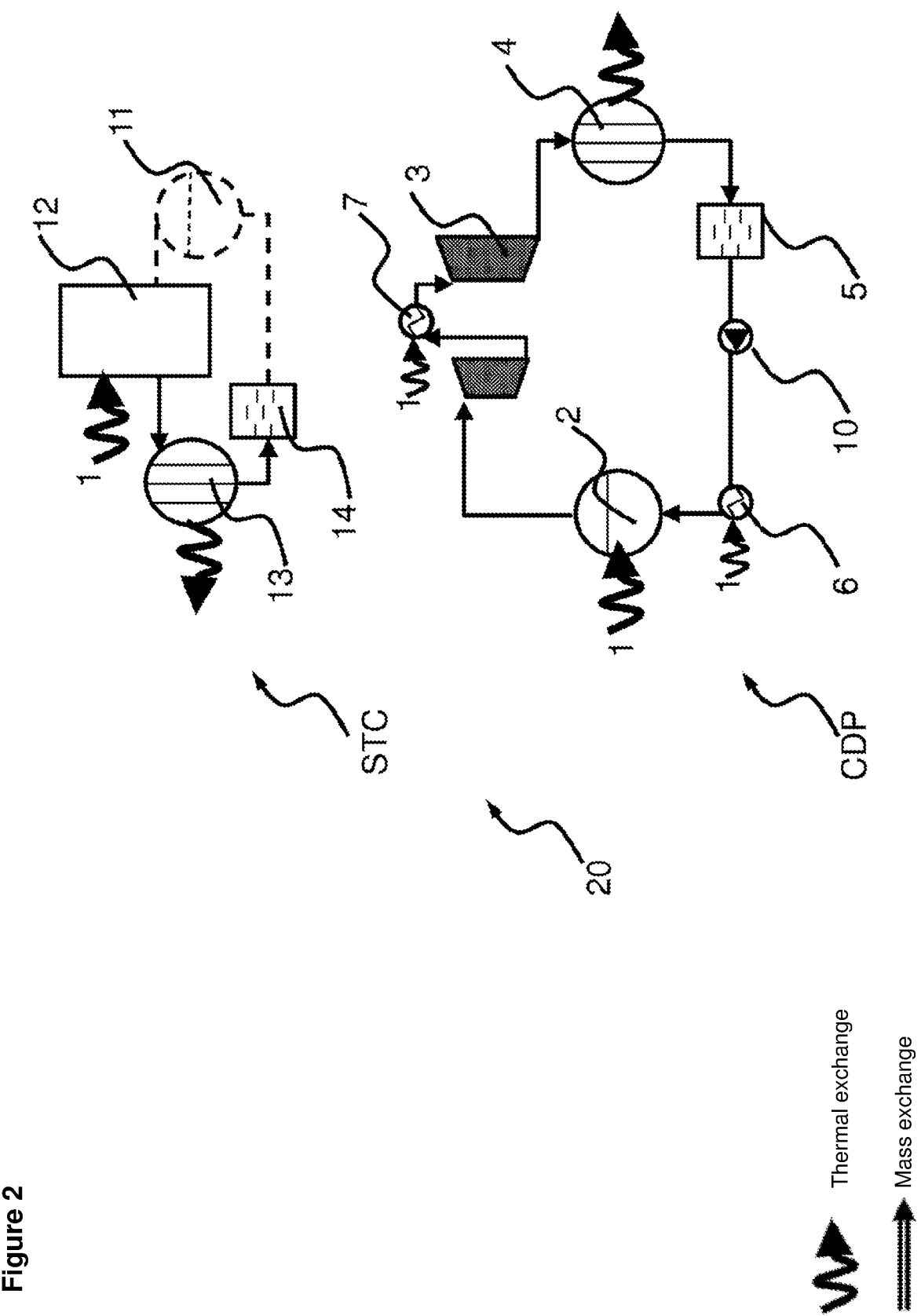
FIG. 2 is a schematic diagram of an installation according to the invention during a heat storage phase.

The details of the operating procedures of the installation which fulfill the three objects of the invention described above are as follows:

During the storage phase, as illustrated in the example of FIG. 2, energy supplied by the external source 1, for example solar, is supplied to an evaporator 2 to operate a conventional Rankine cycle. Simultaneously, the thermochemical reactor 12 is heated for the decomposition of the reagent (eg: $Ca(OH)_2$ hydroxide). The discharged reagent (the oxide CaO in this example) produced is stored in the same reactor 12, while the vapors (water vapor in this example) condense via an exchanger 13 and are stored as a liquid in a tank of water 14. This configuration simultaneously allows the production of electricity and the storage of heat.

Figure 10:
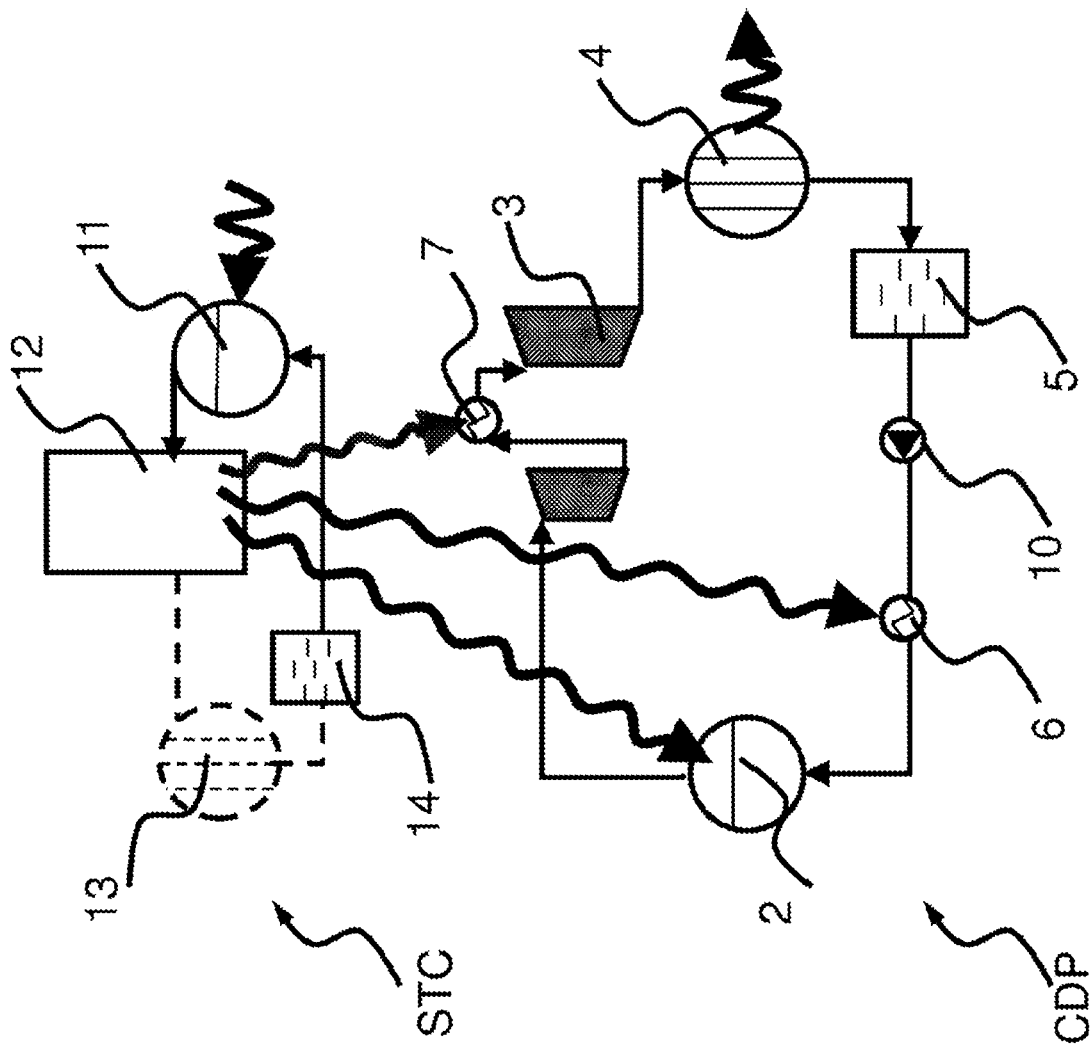
FIG. 10 is a schematic diagram of an installation according to the invention during a heat destocking phase.

Referring to the example of FIG. 10, and for the same $CaO/Ca(OH)_2$ reaction, during the destocking phase when the external energy source is no longer available, the liquid stored in the reservoir 14 is evaporated in the evaporator 11, and this water vapor then enters the reactor 12 and reacts exothermically with the oxide salt to form the hydroxide salt. The heat released by this exothermic reaction subsequently makes it possible to produce high pressure steam in the evaporator 2 of the power cycle and thus maintains the operation of the Rankine cycle for the production of electricity. In this case, the steam generator function is provided by the thermochemical reactor 12.

Figure 13:
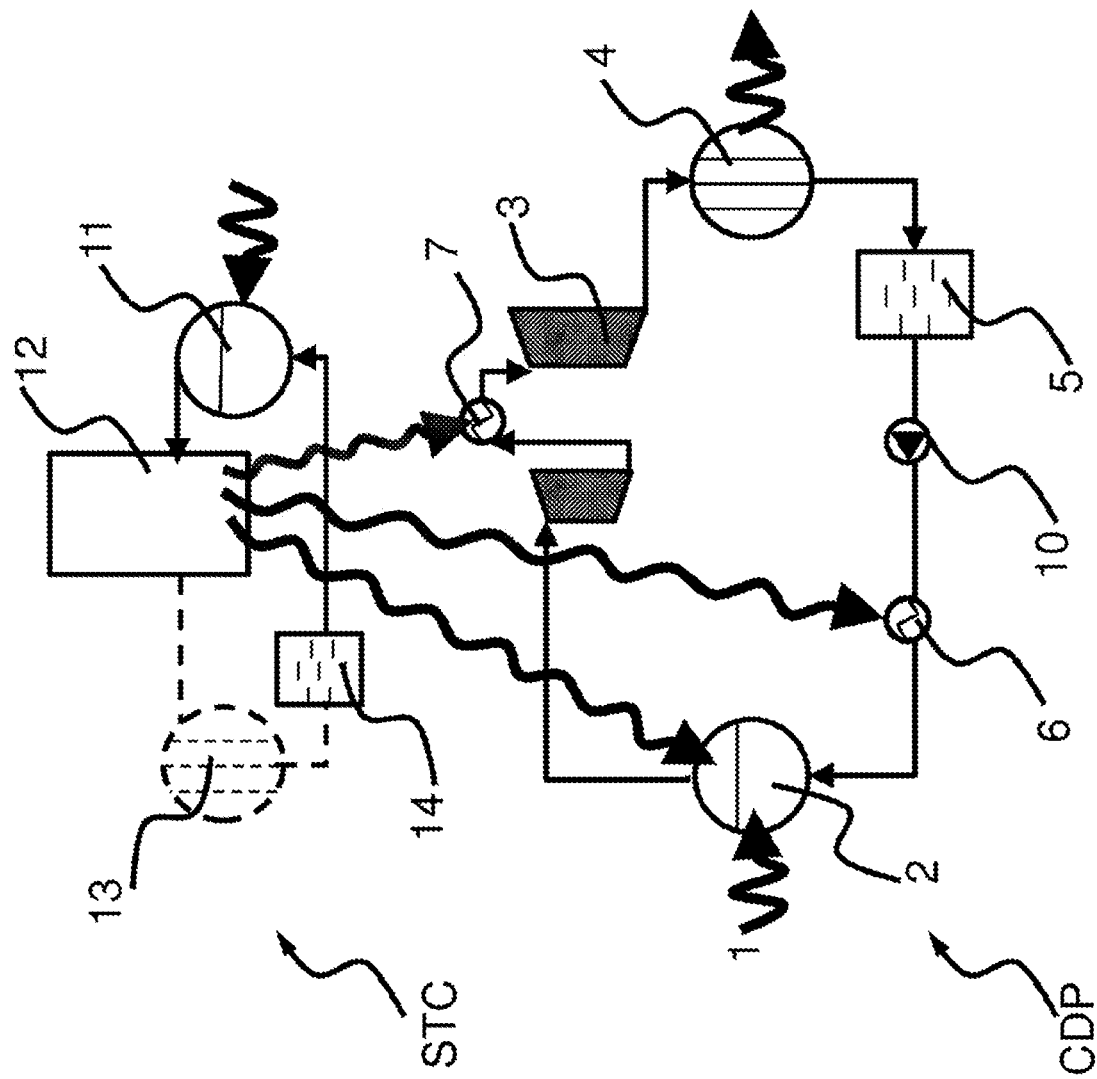
FIG. 13 is a schematic diagram of an installation according to the invention for a greater production of electrical energy during peak hours, or to compensate for a decrease in the external source.

FIG. 13 shows an example of the invention according to a third object. This design of operation notably makes it possible to increase the nominal power of the electricity production to meet the demand during peak hours or when the power of the external source drops and is insufficient to operate the Rankine cycle. Referring to FIG. 13, which illustrates this method, the configuration of the destocking phase remains identical to that just described. During peak hours, this is a heating configuration of the working fluid of the power cycle using the external source but also the heat released by the exothermic reaction, to produce additional work in the turbine 3 stages. With this configuration, the steam generator 2 and the reactor 12 operate in parallel to increase the power output of the power generation during peak hours.

Depending on the procedures, only certain couplings are feasible. Several integration configurations are thus preferably retained, combining different couplings between the external heat source (for example concentrated solar energy), the thermochemical storage system, and the power cycle.

Several examples of integration configurations will be described below with reference to FIGS. 2 to 18.

For the following figures, here is the list of legends and their definitions,

CDP power cycle
STC thermochemical storage system
high temperature external heat source, typically greater than 150° C. corresponding to reference 1,
evaporator of the power cycle corresponding to reference 2,
turbine of the power cycle corresponding to reference 3,
condenser of the power cycle corresponding to reference 4,
CDP power cycle evaporator water supply tank (also constituting a condensed vapor recovery tank), corresponding to reference 5,
preheater for working fluid (liquid) of the power cycle, corresponding to reference 6,
superheater of the steam of the power cycle upstream of a turbine 3, corresponding to the reference 7,
steam extraction from the power cycle, corresponding to reference 8,
heat exchanger for the recovery of heat on a steam withdrawal of the power cycle, corresponding to reference 9,
pressurizing pump of the liquid working fluid of the power cycle, corresponding to reference 10,
evaporator of the thermochemical storage device (STC), corresponding to reference 11,
reactor of the thermochemical storage device, corresponding to reference 12,
condenser of the thermochemical storage device, corresponding to reference 13,
reservoir of the active fluid of the thermochemical storage corresponding to reference 14,
global installation corresponding to reference 20.

1—Configurations Using an External Heat Source when it is Available, Either for Electricity Generation, for Storage or Both Simultaneously.

1a) Simultaneous Heat Storage and Power Generation Configurations from the External Heat Source.

Basic Configuration Corresponding to FIG. 2.

The heat source feeds both the STC storage and the CDP power cycle independently (no connection between the two systems). This is the classic configuration in a storage phase. The advantage of such a configuration is that the systems management is done independently. There is therefore no constraint on the powers implemented, and the sizing of the storage is only related to the duration of the destocking and the electrical power required.

Figure 3:
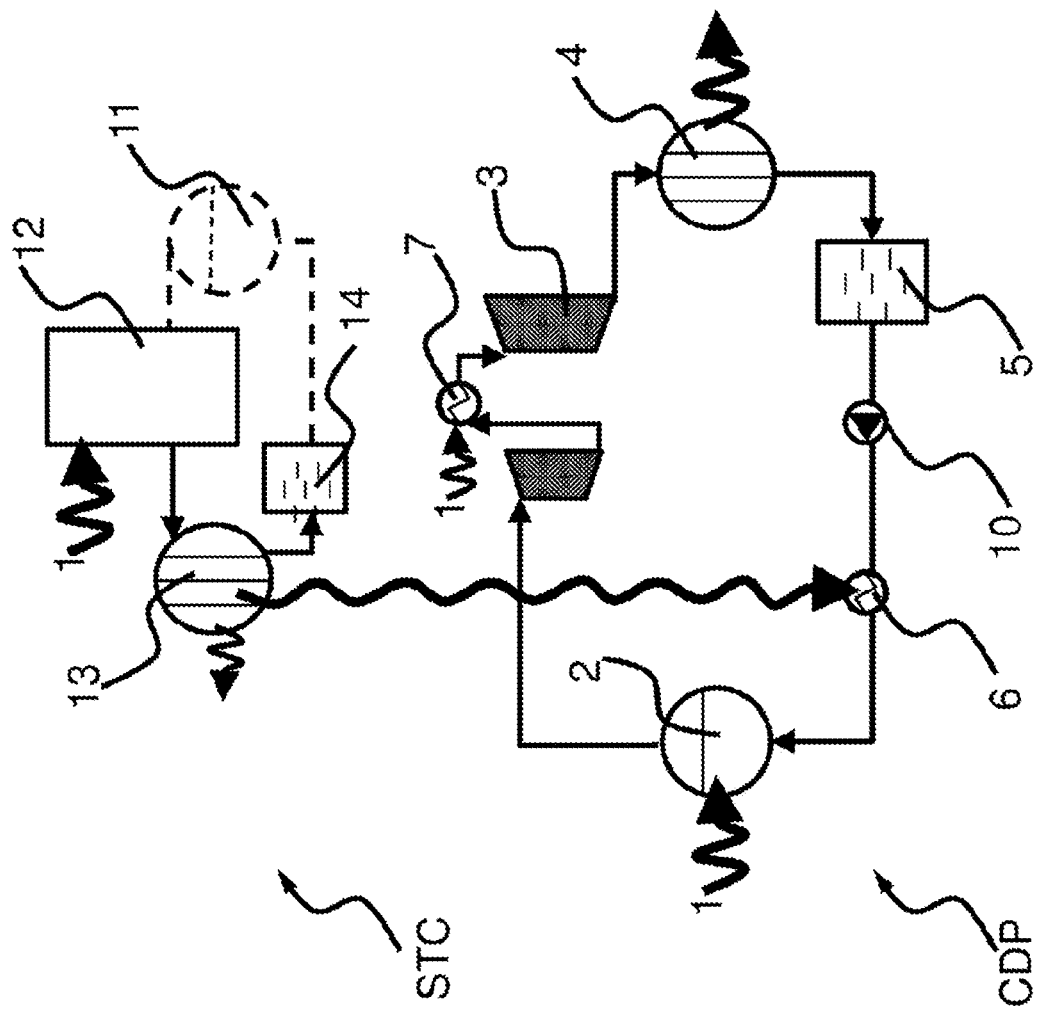
FIG. 3 is a schematic diagram of a first example of an installation according to the invention during a heat storage phase.

Thermal Integration Type Configuration and Corresponding to FIG. 3.

The heat source simultaneously feeds the CDP power cycle and the STC thermochemical storage. There is a thermal connection between the condenser 13 of the STC storage and the preheater 6 of the power cycle CDP. The advantage of such a configuration is that there is preheating of the working fluid of the CDP by steam from the STC reactor, which reduces the external heat input to the CDP and thus partially compensates for the use of the solar field for storage. The heat recovered on this steam can be either sensible (steam desuperheating only, this vapor being condensed later in the STC condenser) or latent by direct condensation in the CDP preheater (thus reducing the heat to be discharged to the condenser from the STC to the atmosphere).

Figure 4:
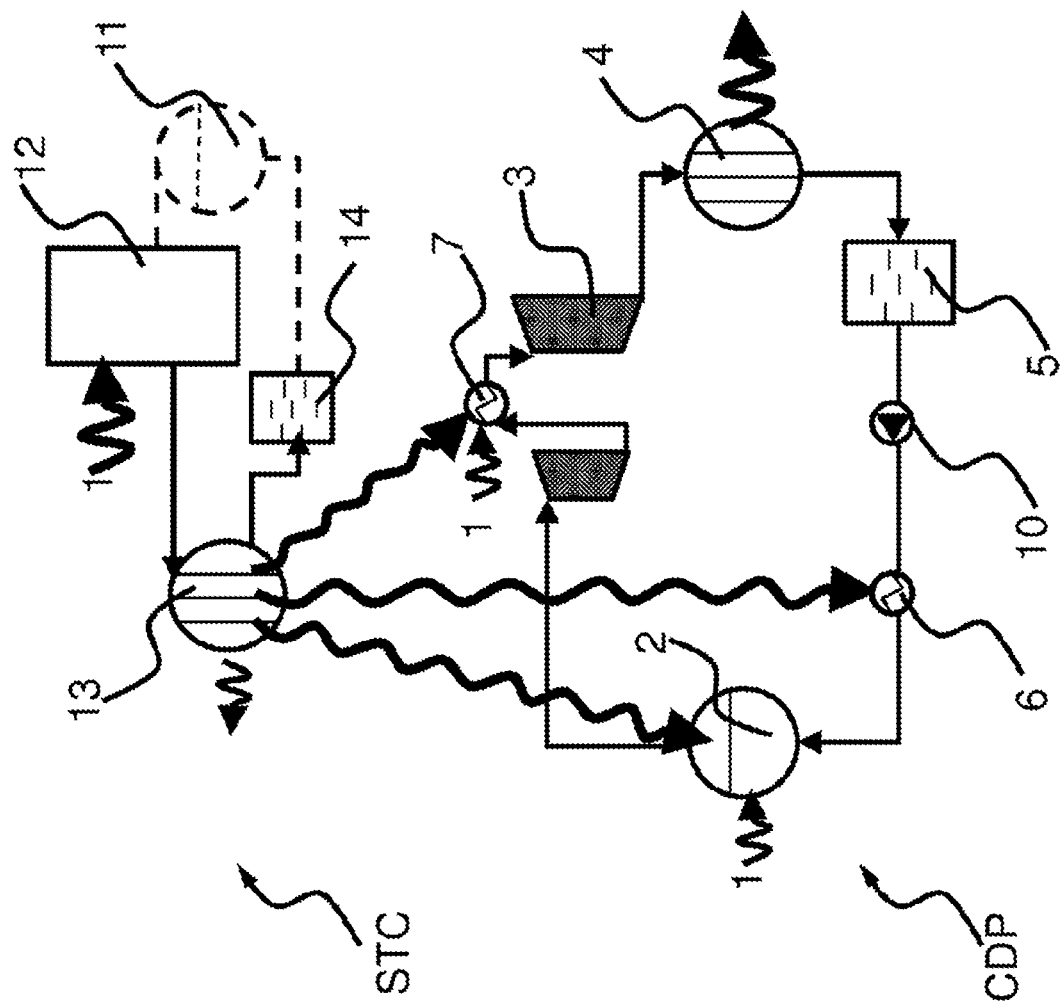
FIG. 4 is a schematic diagram of a second example of an installation according to the invention, during a heat storage phase.

Thermal Integration Type Configuration and Corresponding to FIG. 4.

The heat source simultaneously feeds the CDP power cycle and the STC thermochemical storage. There is a thermal connection between the STC storage condenser 13 and one or all three components of the preheater 6/evaporator 2/superheater 7 of the CDP.

The advantage of such a configuration is that there is all or part of the preheating and evaporation of the CDP working fluid by the steam from the STC reactor, which reduces the heat input to the CDP and thus partially compensates for the use of the solar field for storage. The heat recovered on this steam can be either sensible (steam desuperheating only, this vapor being condensed subsequently in the STC condenser) or latent by direct condensation in the preheater or evaporator of the CDP (thus reducing the heat to be discharged to the condenser from the STC to the atmosphere).

Figure 5:
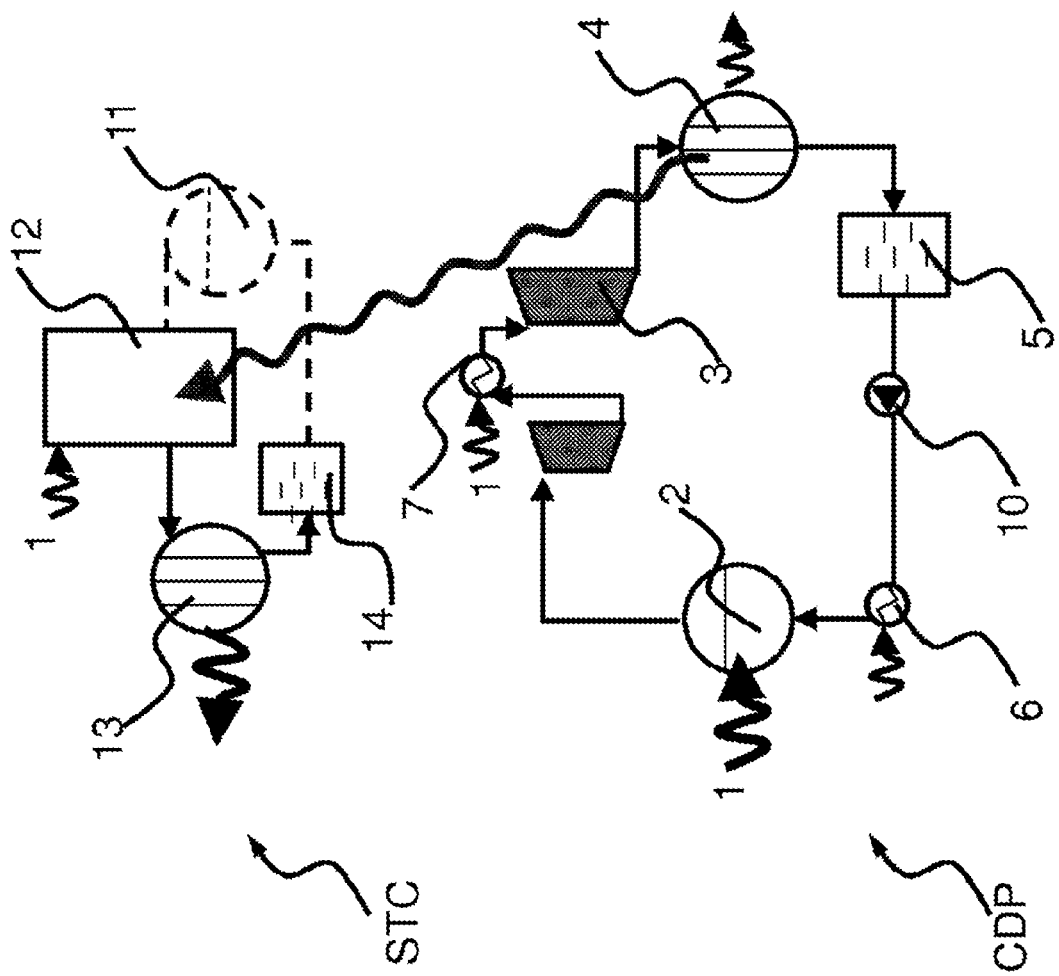
FIG. 5 is a schematic diagram of a third example of an installation according to the invention, during a heat storage phase.

Other Thermal Integration Type Configuration and Corresponding to FIG. 5.

The heat source only powers the CDP power cycle. The residual enthalpy available on the expanded vapors at the outlet of the turbine is stored in the thermochemical storage device STC. There is a thermal connection between the expanded steam of the power cycle CDP and the storage reactor 12 of the STC. The heat recovered on this expanded steam can be either sensible (desuperheating the steam) or latent if it condenses directly into the storage reactor (thus removing the condenser from the CDP).

Figure 6:
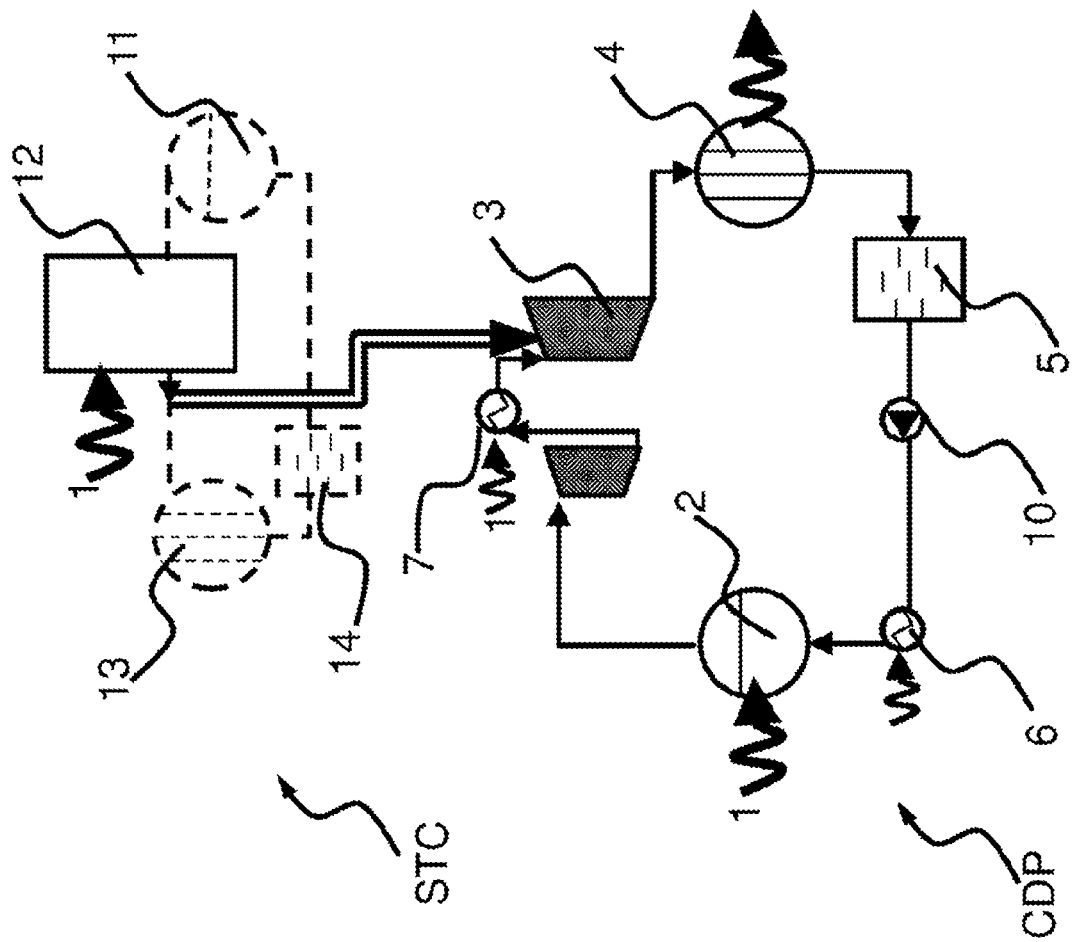
FIG. 6 is a schematic diagram of a fourth example of an installation according to the invention, during a heat storage phase.

Mass Integration Type Configuration and Corresponding to FIG. 6.

The heat source simultaneously feeds the CDP power cycle and the STC thermochemical storage. There is a mass connection between the storage reactor 12 of the STC and the last stage of expansion of a turbine 3 of the CDP, or an additional independent turbine. The advantages of such a configuration are that there is a direct production of additional electricity from the relaxation of the desorbed vapors. This production partially offsets the use of the external heat source 1 (solar field for example) by the storage reactor 12 of the STC for the storage of heat. The return of liquid between the tank 5 of the CDP and the tank 14 of the STC is performed by conventional hydraulic transfer means (not shown in the figure).

1b) Configurations for which there is Heat Storage from the External Heat Source, and Generation of Electricity from Thermal and Mass Discharges from STC Storage.

The advantage of this set of configurations is that there is an electricity production even when the external heat source is totally dedicated to thermochemical storage.

Figure 7:
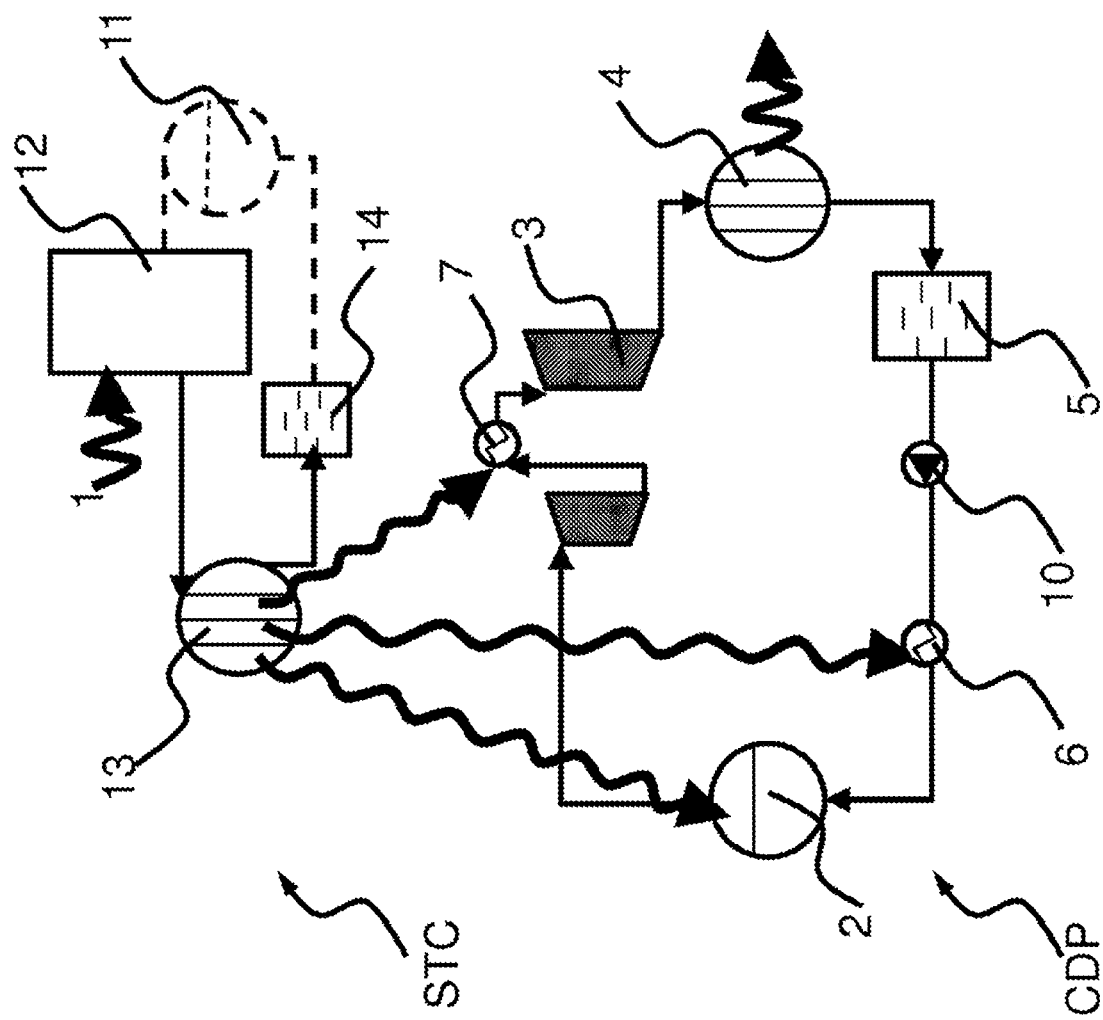
FIG. 7 is a schematic diagram of a fifth example of an installation according to the invention, during a heat storage phase.

Thermal Integration Type Configuration and Corresponding to FIG. 7.

The heat source 1 supplies only the STC storage. The sensible heat and condensing vapors from the STC are used for electricity generation on the last stage of a turbine or an additional turbine. There is a thermal connection between the condenser 13 of the STC and the preheater 6 and evaporator 2 and possibly superheater 7 of the CDP.

Figure 8:
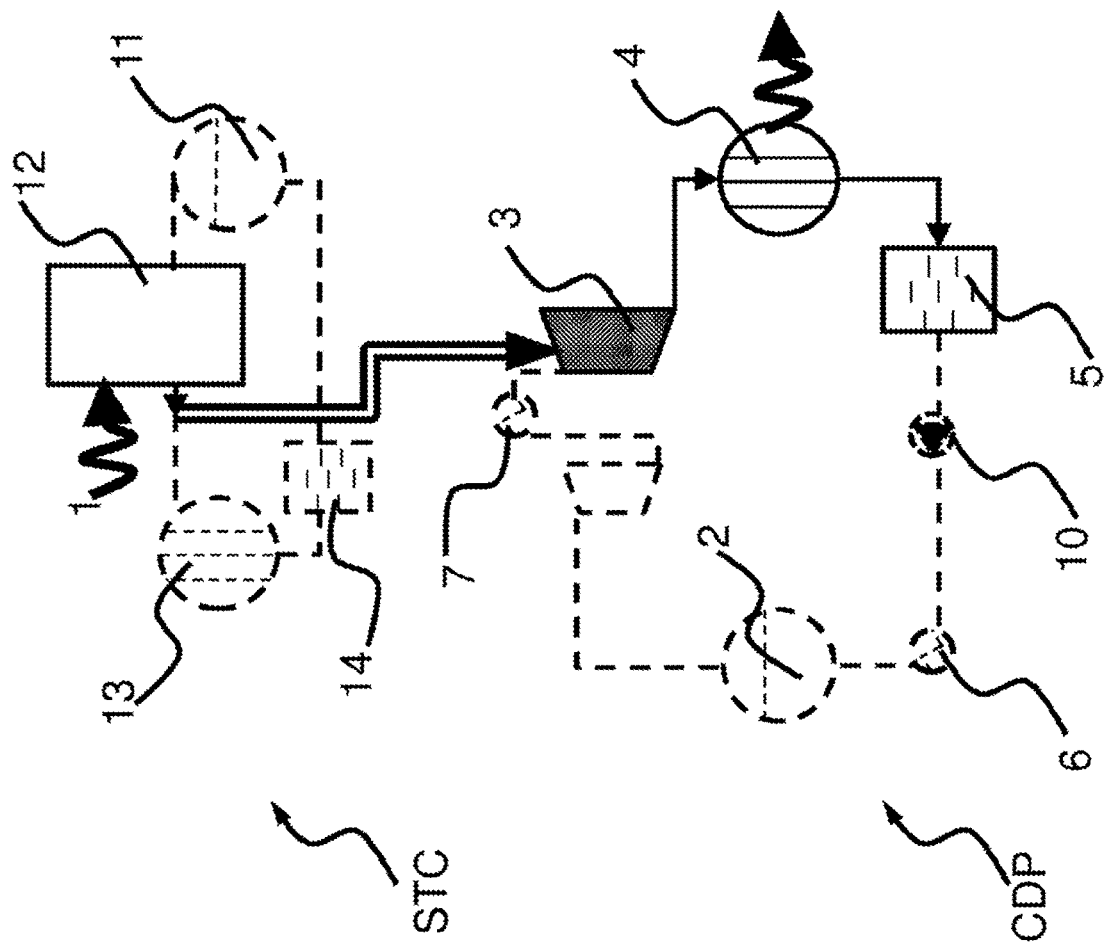
FIG. 8 is a schematic diagram of a sixth example of an installation according to the invention during a heat storage phase.

Mass Integration Type Configuration and Corresponding to FIG. 8.

The heat source supplies only the STC thermochemical storage. The vapors from the high temperature reactor are expanded in a final stage of a power cycle turbine or an additional independent turbine for additional power generation. There is a mass connection between the storage reactor 12 of the STC and the last stage of the turbine 3 of the CDP or an additional independent turbine. The advantages of such a configuration are that there is an additional generation of electricity only from the relaxation of the vapors desorbed at high temperature by the STC storage reactor, and that the solar field is sized and used for thermochemical storage.

Figure 9:
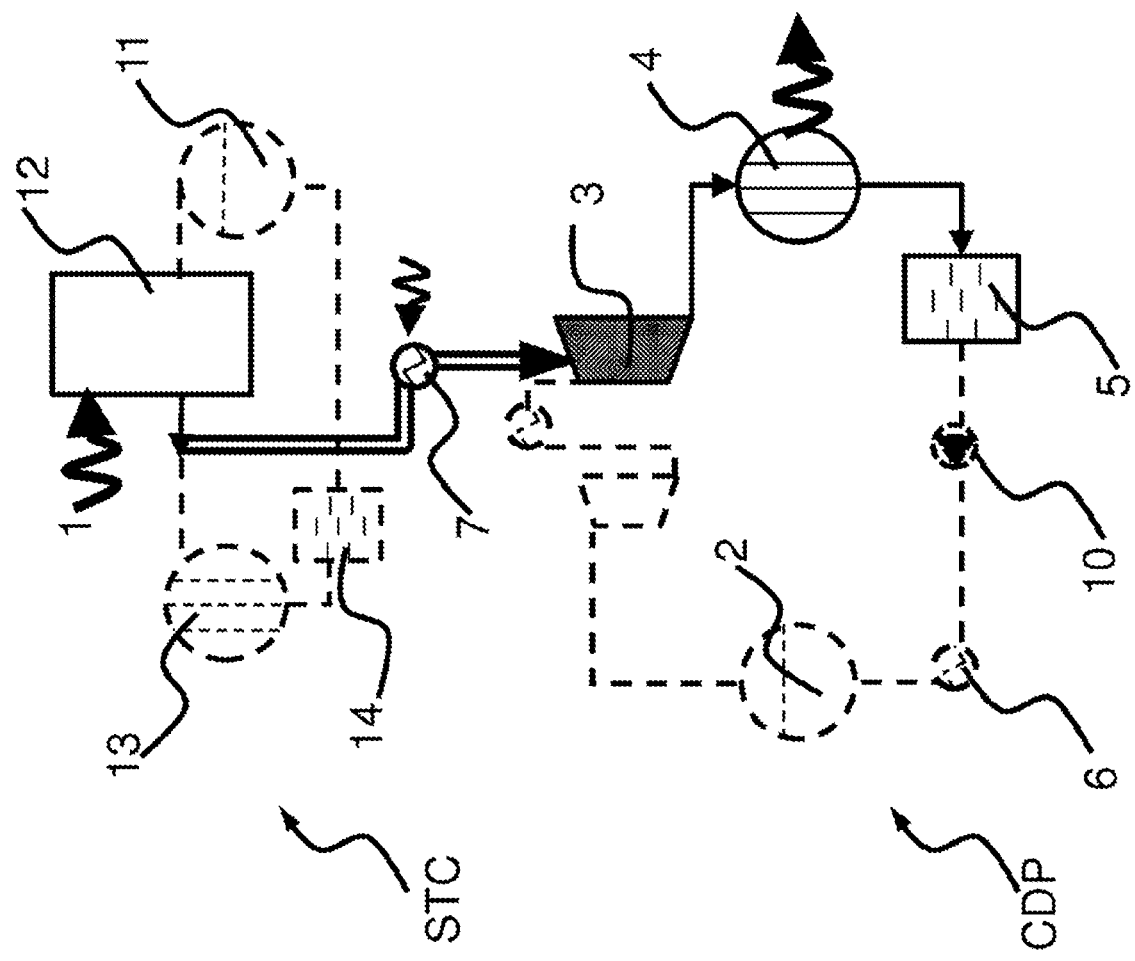
FIG. 9 is a schematic diagram of a seventh example of an installation according to the invention, during a heat storage phase.

Other Mass Integration Type Configuration and Corresponding to FIG. 9.

If in the preceding configuration (corresponding to FIG. 8), the temperature of the vapors desorbed by the reactor 12 is not sufficient for them to be expanded in the turbine, an intermediate heat exchanger 7 supplied by the heat source can be used to increase this temperature.

2—Configurations Using STC Thermochemical Storage During the Destocking Phase:

These configurations use only heat from STC storage to allow power generation through the CDP power cycle, even in the event of temporary non-availability of the external heat source (eg intermittent daytime, or nighttime for a solar source).

Basic Configurations Corresponding to FIG. 10.

For this configuration, destocking and power generation are provided from the heat removed by the STC reactor. There is therefore a thermal connection between the reactor 12 and the preheater 6/evaporator 2/superheater 7 of the power cycle.

Figure 11:
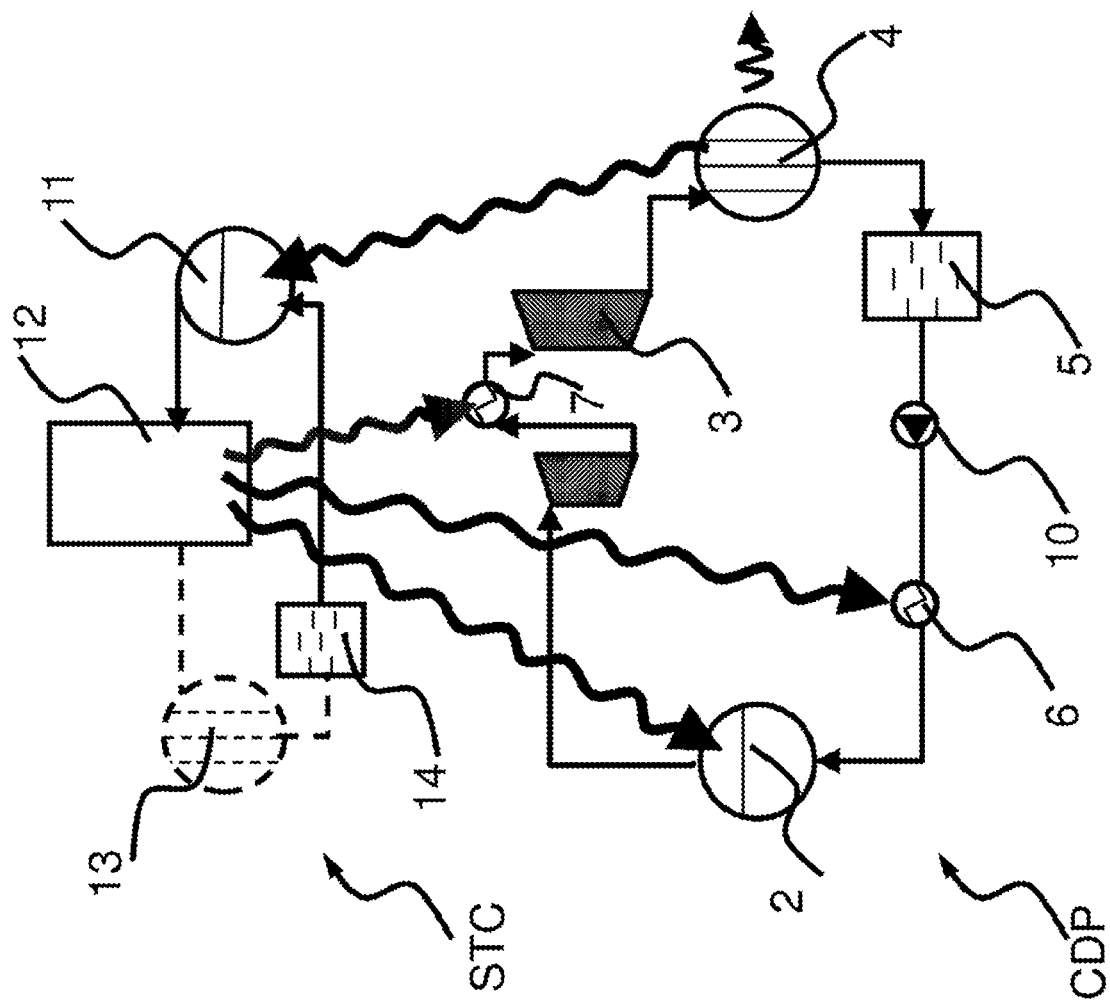
FIG. 11 is a schematic diagram of an eighth example of an installation according to the invention, during a heat destocking phase.

Thermal Integration Type Configurations Corresponding to FIG. 11.

For this configuration, heat destocking and power generation are provided from the heat removed by the reactor. There is therefore a thermal connection between said reactor 12 and the preheater 6/evaporator 2/superheater 7. In addition, there is a thermal connection between the condenser 4 of the power cycle and the evaporator 11 of the thermochemical storage STC. The advantages of such a configuration are that there is a reduction of the heat evacuated at the condenser of the CDP, and that the evaporator of the STC operates at higher temperature and therefore at higher pressure, hence a return of heat by the reactor 12 of the STC at higher temperature. As a result, the CDP cycle operates at a higher temperature and therefore has improved performance.

Figure 12:
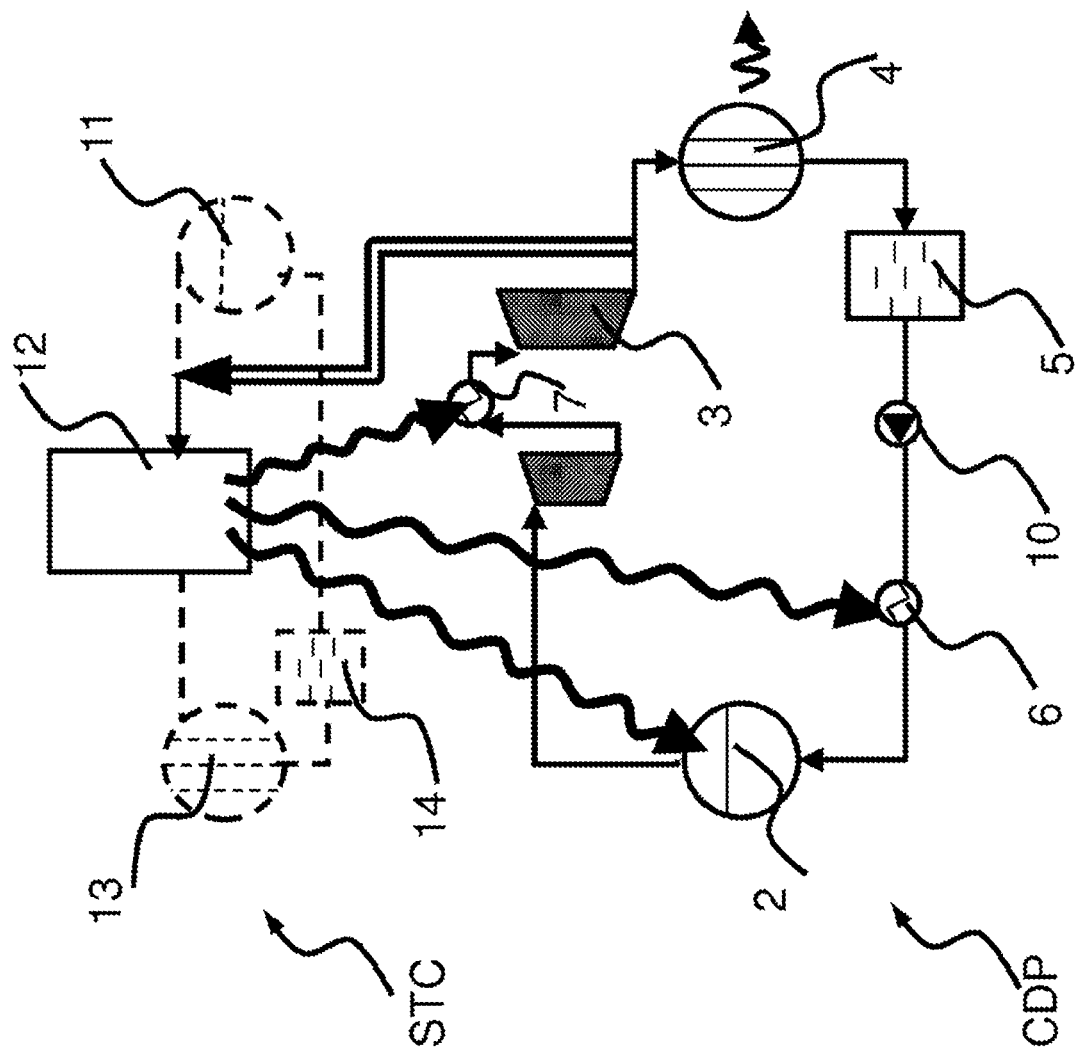
FIG. 12 is a schematic diagram of a ninth example of an installation according to the invention, during a heat destocking phase.

Mass Integration Type Configurations Corresponding to FIG. 12.

For this configuration, there is a mass connection between the reactor and the turbine outlet: part of the expanded vapors at the turbine outlet 3 is absorbed by the reactor 12. One possible variant would be to make a mass connection by vapor withdrawal between two turbine stages 3. In this way, the vapor pressure would be higher and therefore the retrieval temperature at the reactor 12 would be higher. The return of liquid between the tank 14 of the STC and the tank 5 of the CDP is carried out by conventional hydraulic transfer means.

3—Configurations Using the External Heat Source and STC Reactor During the Destocking Phase These configurations described below use the external heat source for power generation and simultaneously destocking for additional power generation.

The interests of such configurations are as follows: ensure peak production, ensure a given electricity production even when the heat source decreases in intensity (source variability at the end of the day for example in the solar case).

Basic Configurations Corresponding to FIG. 13.

This is to achieve a thermal coupling of the thermochemical reactor 12 and the heat source 1 with the preheater 6/evaporator 2/superheater 7 of the power cycle.

Figure 14:
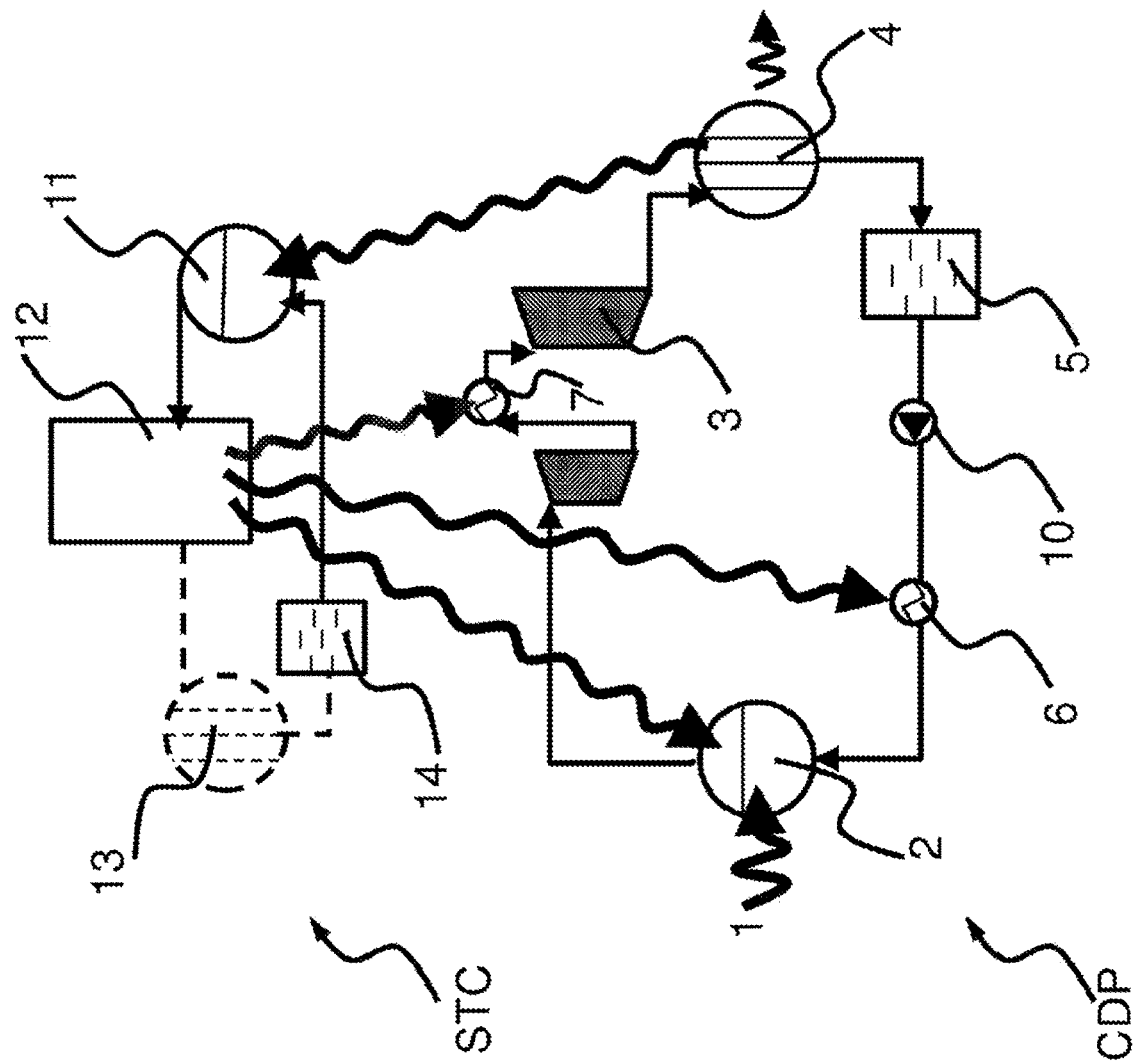
FIG. 14 is a schematic diagram of a tenth example of an installation according to the invention, for a larger electrical energy production.

Thermal Integration Type Configurations Corresponding to FIG. 14.

This configuration corresponds to a recovery of the condensation heat of the CDP power cycle to the evaporator 11 of the thermochemical storage STC so that the STC and CDP assembly operates at a higher temperature. As a result, the CDP cycle operates at higher pressure and thus has improved performance.

Figure 15:
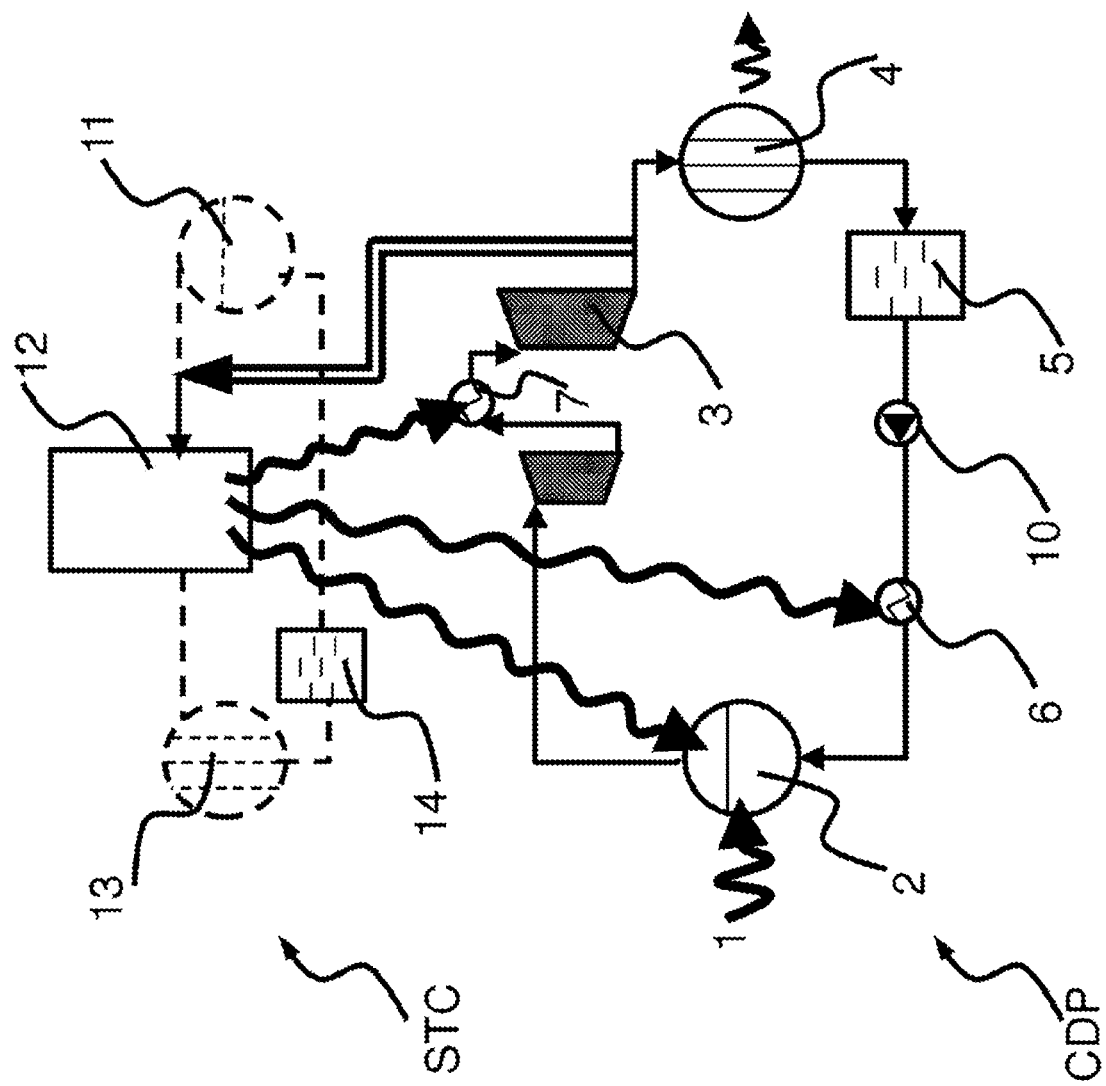
FIG. 15 is a schematic diagram of an eleventh example of an installation according to the invention, for a larger electric power production.

Mass Integration Type Configurations Corresponding to FIG. 15.

For this configuration, there is a mass connection which allows the transfer of the expanded vapors at the outlet of the turbine 3, or withdrawn between two turbine stages, to the reactor 12 in the heat destocking phase where they are absorbed. This configuration increases the operating temperature of the reactor 12 in destocking and reduces the amount of energy to be removed by the condenser 4 of the power cycle.

4—Case of Power Cycles with Steam Withdrawals.

Figure 16:
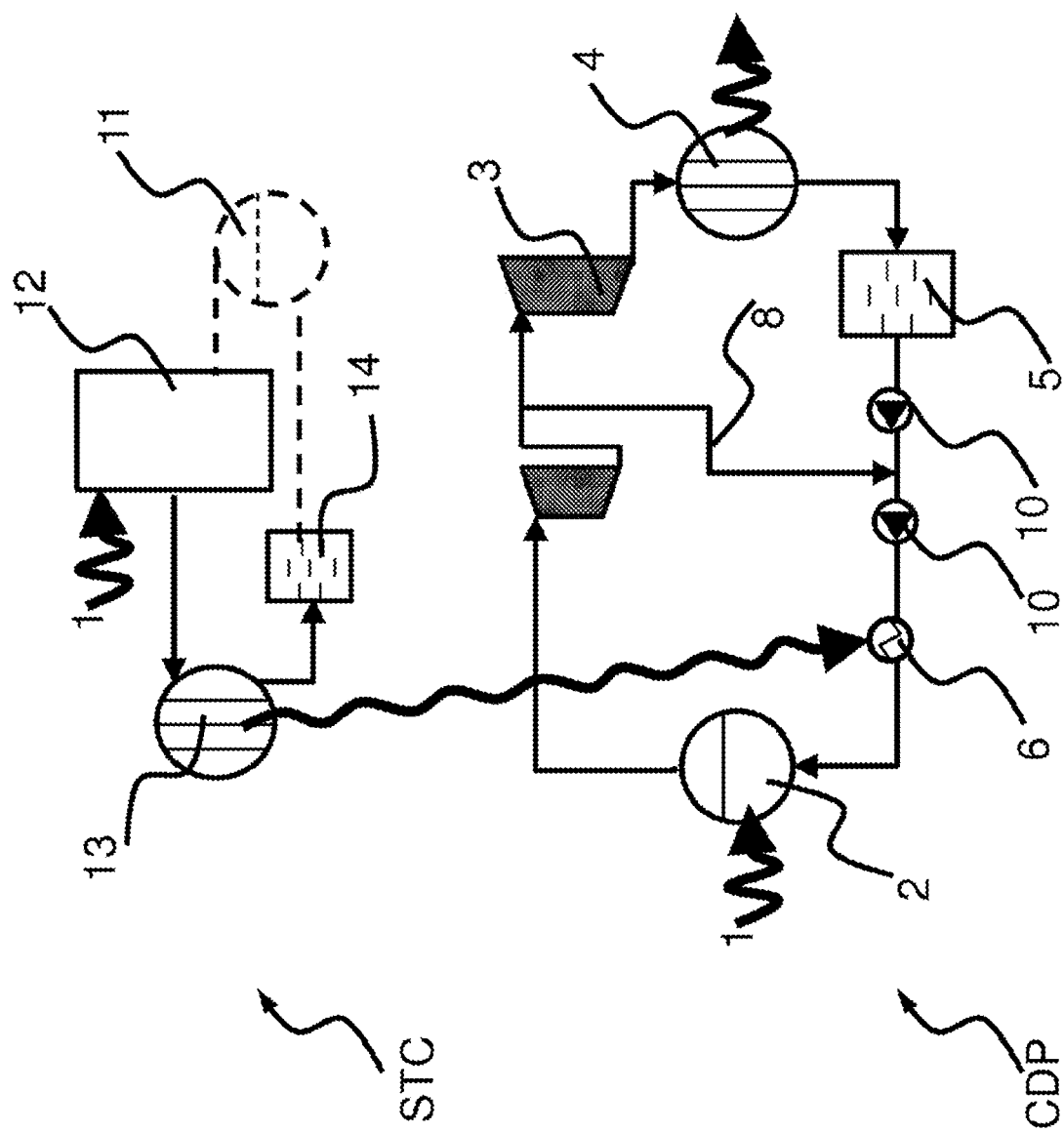
FIG. 16 is a schematic diagram of a twelfth example of an installation according to the invention, using a vapor withdrawal, during a heat storage phase.

Steam withdrawals between two stages of the power cycle allow other integration configurations described in the following Configurations Using the External Source for Simultaneous Power Generation and Heat Storage As illustrated by the example of FIG. 16, during the storage phase, external energy 1 which may for example be solar energy, is supplied to a steam generator 2 for operating a Rankine cycle classic with racking 8. Simultaneously, the thermochemical reactor 12 is heated for the decomposition of the reagent. The steam produced (water vapor in this example) condenses via a first exchanger 13 and is stored as a saturated liquid in an independent water tank 14. There is a thermal connection between the condenser 13 of the STC storage and the preheater 6 of the power cycle CDP. With this heat exchange, sensitive and latent heat storage vapors are recovered for pre heating 6 of the working fluid (liquid) of the Rankine cycle.

Figure 17:
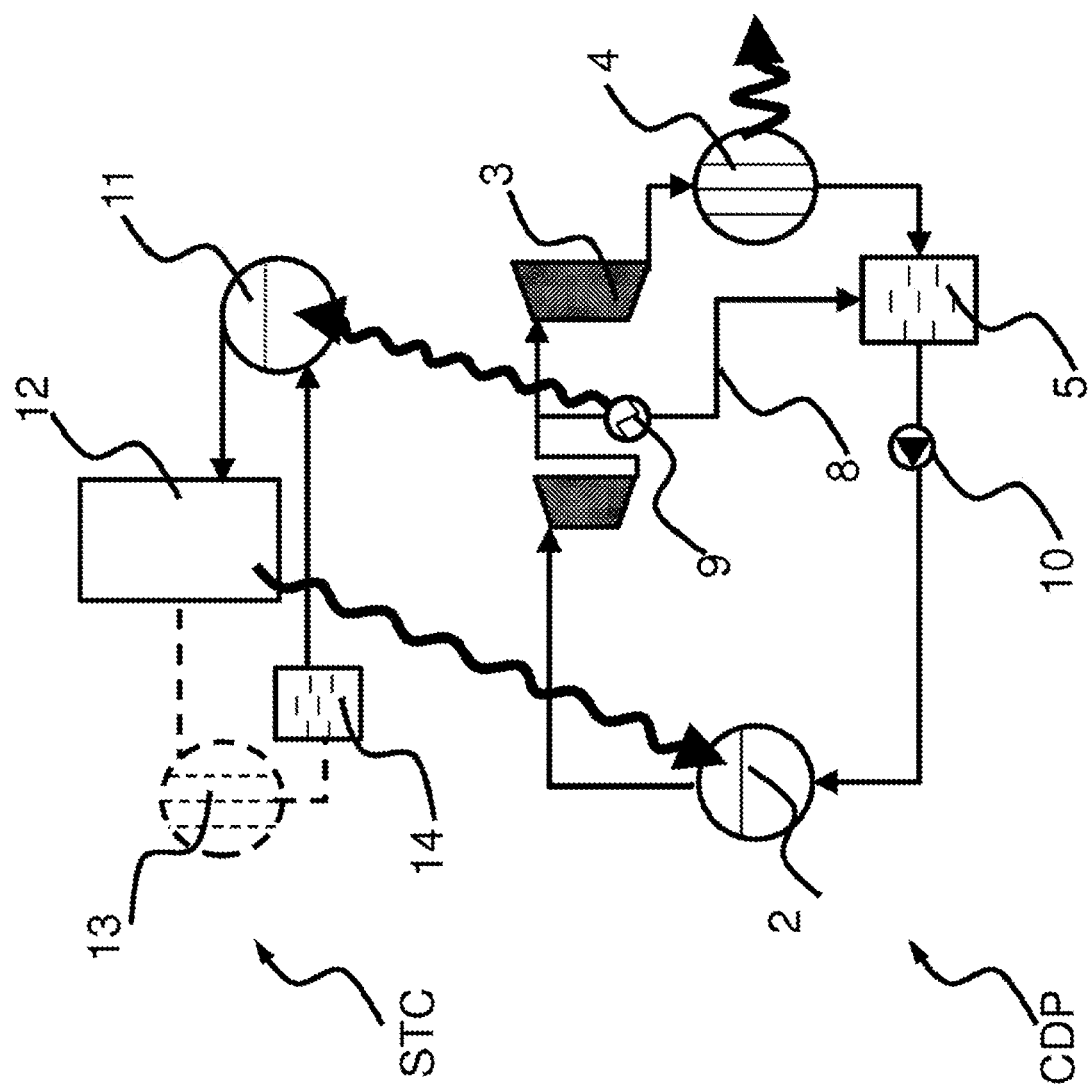
FIG. 17 is a schematic diagram of a thirteenth example of an installation according to the invention, using a vapor withdrawal, during a heat destocking phase.

Configurations Using STC Thermochemical Storage During the Destocking Phase:

During the destocking phase when the external energy is no longer available, as in the example of FIG. 17, the liquid water stored in the tank 14 is first evaporated at 11 thanks to the heat recovered from the vapors of extraction 8 of the first stage of the turbine 3. This water vapor thus produced then enters the reactor 12 and reacts exothermically with the oxide in the example presented. The heat released by this exothermic reaction subsequently makes it possible to produce high pressure steam in the evaporator 2 of the power cycle and thus maintains the operation of the Rankine cycle for the production of electricity. In this case, the steam generator function is replaced by the thermochemical reactor 12

Figure 18:
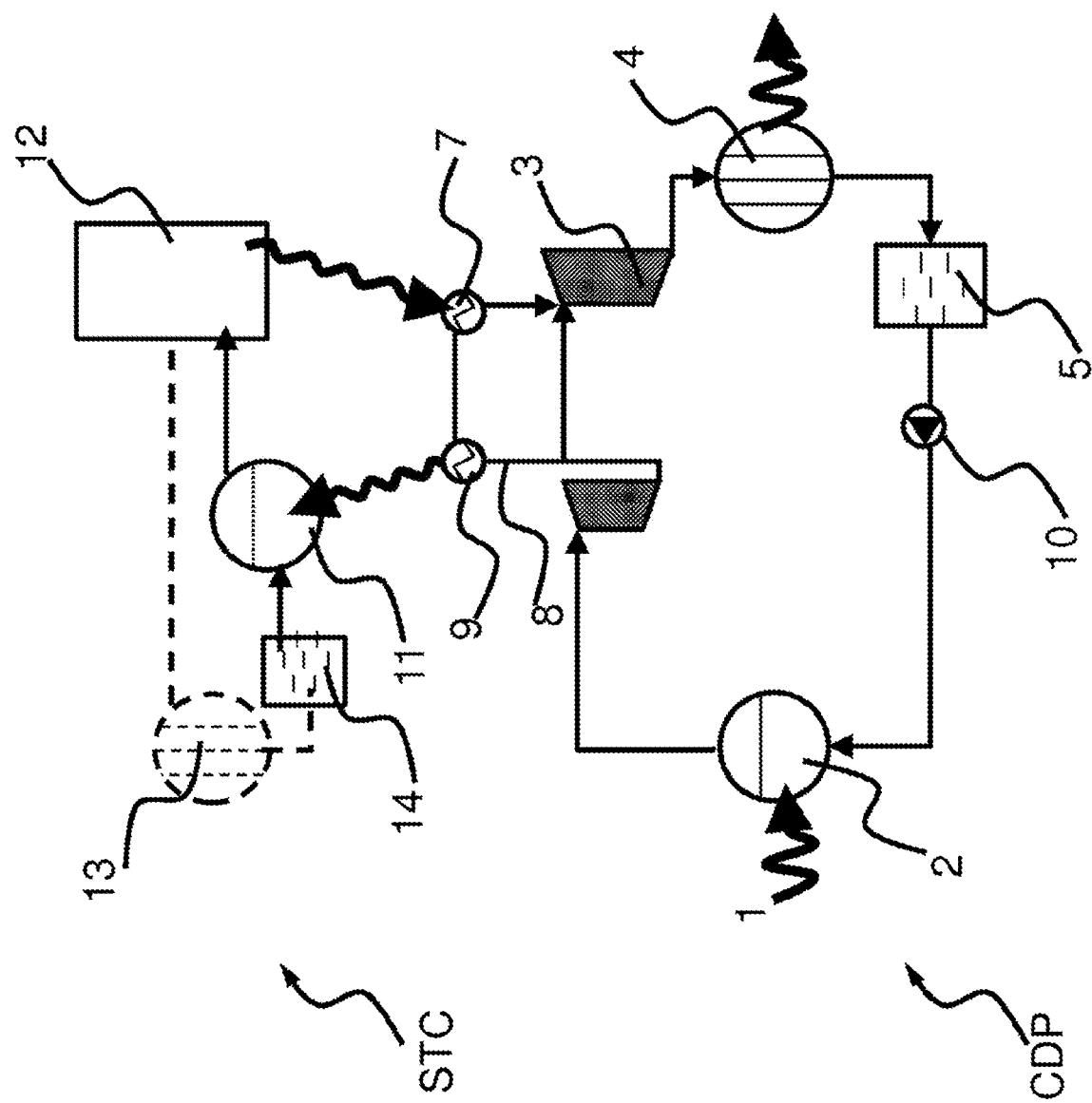
FIG. 18 is a schematic diagram of a fourteenth example of an installation according to the invention, using a vapor withdrawal, for a larger electric power production.

Configurations Using the External Heat Source and STC Reactor During the Destocking Phase Referring to FIG. 18, which illustrates this method, the configuration of the destocking phase remains identical to that just described. During peak hours, this is a heating configuration of the working fluid of the power cycle using cascading turbines 3. More precisely, the vapors of the cycle coming out of the withdrawal 8 of the first turbine stage 3 are used for the evaporation 11 of the liquid water stored in the tank 14 during storage. The heats released by the 12-exothermic reaction are used to heat the Rankine cycle vapors at a high temperature, in order to clear the work in the second turbine stage 3. With this configuration, the steam generator 2 and the reactor 12 operate in parallel to increase the power output of the power generation during peak hours.

The invention claimed is:

1. An installation for generating electricity from a driving external heat source having one or more of intermittent availability and variability in one or more of thermal power, temperature, economic value, the driving external heat source being a heat generating device to dissociate generation of electricity from use of said driving external heat source over time, the installation comprising:

a thermochemical storage device coupled to a power cycle chosen from a plurality of steam cycles, the thermochemical storage device comprising
a reactor in which a reversible sorption process takes place,
an evaporator, and
a condenser,
at least one of the reactor, the evaporator, and the condenser of the thermochemical storage device being coupled by mass as a vapor exchange, or mass as a vapor exchange and thermally as a heat transfer to at least one element of said power cycle,
wherein the thermochemical storage device and the power cycle operate with a same working fluid, the power cycle serving as a source or a sink of reactive gas for the thermochemical storage device.

2. The installation according to claim 1, wherein the power cycle is a Rankine cycle and comprises a first heat exchanger accepting heat from an external source, a second heat exchanger discharging heat at a lower temperature, and an expansion member of steam.

3. A method of generating electricity in an installation according to claim 1, the method comprising:
coupling the external heat source and at least one element of the installation to store heat in the thermochemical storage device; and
generating power by the power cycle.

4. The electricity generation method according to claim 3, wherein the external heat source simultaneously feeds the power cycle and the thermochemical storage device, and
wherein a thermal coupling is achieved between desuperheating and condensation of vapor of the thermochemical storage device, and at least one of the elements of a preheater assembly, an evaporator, and a superheater of a working fluid of the power cycle.

5. The electricity generation method according to claim 3, wherein the external heat source feeds the power cycle, and
wherein a thermal coupling is achieved between the reactor of the thermochemical storage device and expanded vapors from an expansion member of the power cycle.

6. The electricity generation method according to claim 3, wherein the external heat source simultaneously feeds the power cycle and the thermochemical storage device, and
a mass coupling occurs between the reactor of the thermochemical storage device and an expansion stage of a turbine of the power cycle or an additional independent turbine.

7. The electricity generation method according to claim 3, wherein the external heat source feeds only the thermochemical storage device, and
wherein thermal coupling is achieved between the condenser of the heating device, thermochemical storage, a preheater, and an evaporator and optionally a superheater of the power cycle.

8. The electricity generation method according to claim 3, wherein the external heat source feeds only the thermochemical storage device, and
wherein a mass coupling occurs between the reactor of the heating device, thermochemical storage, and an expansion stage of a turbine of the power cycle.

9. The method of generating electricity according to claim 8, further comprising operating an intermediate heat exchanger supplied by the external heat source to increase the temperature of the vapors desorbed by the thermochemical storage.

10. A method of generating electricity in the installation according to claim 1, the method comprising:
thermal coupling the reactor of the thermochemical storage device and an assembly including a preheater, an evaporator, and a superheater belonging to the power cycle; and
destocking and generating electricity from the heat destocked by said reactor and transmitted to said assembly.

11. The method of generating electricity according to claim 10, further comprising thermal coupling a condenser of the power cycle and the evaporator of the thermochemical storage device, to recover from the heat of said condenser to supply said evaporator of the thermochemical storage device.

12. The electricity generation method according to claim 10, further comprising thermal coupling the evaporator of the thermochemical storage device and an expansion stage of a turbine of the power cycle, to recover heat, by an exchanger, on a vapor withdrawal at one or more intermediate stages of said turbine to supply said evaporator.

13. The electricity generation method according to claim 10, further comprising mass coupling between the reactor of the thermochemical storage device and an outlet of a turbine of the power cycle, so that part of expanded vapors at the outlet of the turbine is absorbed by said reactor in the destocking.

14. A method of generating electricity in the installation according to claim 1, the method comprising:
generating electricity by the power cycle simultaneously using the external heat source and removal of heat accumulated in the thermochemical storage device.

15. The method of generating electricity according to claim 14, further comprising of thermal coupling a condenser of the power cycle and the evaporator of the thermochemical storage device, to recover from the heat of said condenser to supply said evaporator.

16. The electricity generation method according to claim 14, further comprising:
thermal coupling an evaporator of the thermal storage device and an expansion stage of a turbine of the power cycle, to recover heat, by an exchanger, on a withdrawal at the stages of said turbine to supply said evaporator; and
thermal coupling the reactor of the thermal storage device and the withdrawal to superheat this steam, by a superheater to supply a following expansion stage of the turbine of the power cycle.

17. The electricity generation method according to claim 14, further comprising mass coupling the reactor of the thermochemical coupling device and an outlet of a turbine of the power cycle, so that a part of expanded vapors at the turbine outlet is absorbed by said reactor destocking.

18. The installation of claim 1, wherein the steam cycle is selected from the group consisting of organic or non-organic Rankine cycles, Hirn or Kalina.

19. The installation of claim 2, wherein the expansion member of steam is a steam turbine.

20. A method of generating electricity in the installation according to claim 2, the method comprising:
coupling the external heat source and at least one element of the installation to store heat in the thermochemical storage device; and
generating power by the power cycle.

* * * * *